(12) United States Patent
Panz et al.

(10) Patent No.: US 8,614,256 B2
(45) Date of Patent: Dec. 24, 2013

(54) HYDROPHOBIC PRECIPITATED SILICA FOR DEFOAMER FORMULATIONS

(75) Inventors: Christian Panz, Wesseling (DE); Rene Allerdisse, Cologne (DE); Helga Obladen, Bruehl (DE); Mario Loebbus, Aschaffenburg (DE); Anja Lukas, Hanau (DE); Roland Bergmann, Grosskrotzenburg (DE); Karl Meier, Alfter (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/018,763

(22) Filed: Feb. 1, 2011

(65) Prior Publication Data

US 2011/0172343 A1     Jul. 14, 2011

Related U.S. Application Data

(63) Continuation of application No. 11/037,118, filed on Jan. 19, 2005, now abandoned.

(30) Foreign Application Priority Data

Feb. 3, 2004   (DE) .......................... 10 2004 005 411

(51) Int. Cl.
*B01D 19/04* (2006.01)
*C01B 33/14* (2006.01)
*C08K 3/36* (2006.01)

(52) U.S. Cl.
USPC ............ 516/34; 516/100; 516/116; 516/117; 423/339; 106/490; 106/287.34; 427/220; 428/405

(58) Field of Classification Search
USPC .................... 516/100, 116, 117, 34; 423/339; 106/490, 287.34; 427/220; 428/405
See application file for complete search history.

(56) References Cited

U.S. PATENT DOCUMENTS

| | | |
|---|---|---|
| 3,714,068 A | 1/1973 | Miller et al. |
| 5,256,196 A | 10/1993 | Chjonowski et al. |
| 5,321,070 A | 6/1994 | Meier et al. |
| 5,846,506 A | 12/1998 | Esch et al. |
| 5,851,502 A | 12/1998 | Turk et al. |
| 6,077,466 A | 6/2000 | Turk et al. |
| 6,191,122 B1 | 2/2001 | Lux et al. |
| 6,846,865 B2 | 1/2005 | Panz et al. |
| 6,899,951 B2 | 5/2005 | Panz et al. |
| 6,956,080 B2 | 10/2005 | Scholz et al. |
| 7,022,375 B2 | 4/2006 | Schachtely et al. |
| 7,074,457 B2 | 7/2006 | Panz et al. |
| 7,204,969 B2 | 4/2007 | Kuhlmann et al. |
| 8,007,751 B2 * | 8/2011 | Panz et al. ..................... 423/335 |
| 2003/0130379 A1 | 7/2003 | Panz et al. |
| 2003/0144404 A1 | 7/2003 | Schachtely et al. |
| 2003/0162881 A1 | 8/2003 | Panz et al. |
| 2003/0195290 A1 | 10/2003 | Scholz et al. |
| 2005/0282934 A1 | 12/2005 | Brinkmann et al. |
| 2007/0286788 A1 | 12/2007 | Panz et al. |
| 2007/0299203 A1 | 12/2007 | Panz et al. |
| 2008/0173739 A1 | 7/2008 | Meier et al. |

FOREIGN PATENT DOCUMENTS

| | | |
|---|---|---|
| EP | 1 018 354 | 7/2000 |
| EP | 1281734 | 2/2003 |
| EP | 1281735 | 2/2003 |
| WO | WO 03/014020 | 2/2003 |

OTHER PUBLICATIONS

SIPERNAT®, Product Information, SIPERNAT® D 13, Evonik Industries AG, Parssipany, NJ, USA, Feb. 2012, pp. 1-2.*
SIPERNAT®, Product Information, SIPERNAT® D 10, Evonik Industries AG, Parssipany, NJ, USA, Mar. 2013, pp. 1-2.*
Brochure, Evonik Industries, Specialty Silica, SIPERNAT®, SIDENT®, Evonik Industries AG, Parssipany, NJ, USA, May 2009, pp. 1-36.*

* cited by examiner

*Primary Examiner* — Daniel S Metzmaier
(74) *Attorney, Agent, or Firm* — Oblon, Spivak, McClelland, Maier & Neustadt, L.L.P.

(57) ABSTRACT

A hydrophobic precipitated silica having a BET of less than 110 m²/g, a CTAB of less than 150 m²/g, a BET/CTAB ratio of less than 3, a carbon content of greater than 3.1%, a pH of 9.7 to 10.5, a DBP of less than 230 g/(100 g), and a methanol wettability of more than 50%. The hydrophobic precipitated silica is used in compositions including defoamers, silicone rubber and HTV crosslinkable silicone rubber compositions. The hydrophobic precipitated silica is also useful as a flow assistant and carrier or anti-blocking agent.

11 Claims, 5 Drawing Sheets

CONTIFOAM-Apparatus

HYDROPHOBIC PRECIPITATED SILICA FOR DEFOAMER FORMULATIONS

BACKGROUND OF THE INVENTION

1. Field of the Invention

The present invention relates to hydrophobic precipitated silicas of high pH and low silanol group density, to a process for preparing them and to their use, such as in defoamers, fillers or carriers.

2. Description of the Related Art

Hydrophobic precipitated silicas and processes for preparing them are known. Hydrophobicization is accomplished generally by populating the surface of a hydrophilic precipitated silica with suitable organic compounds. Examples of such hydrophobic or partly hydrophobic precipitated silicas are disclosed in patents EP 0 798 348, U.S. Pat. No. 4,377,493 and EP 1 281 735, EP 1 281 733 and EP 1 281 735 disclose hydrophobic precipitated silicas with a pH of 5-9, while WO 2003014020 discloses those having a pH of more than 9.5.

The use of hydrophilic and hydrophobic precipitated silicas in defoamer formulations is likewise known (Pigments Technical Bulletin 42, DEGUSSA, June 1986). Utility in defoamer formulations imposes exacting requirements on the precipitated silicas. Thus they ought to be readily and effectively dispersible into the defoamer formulation and ought to lead to a rapid knockdown time (response time), complete knockdown (immediate effect) and long holddown (service life). Knockdown describes the ability of the defoamer to reduce the height of the foam immediately following addition, down to a defined height of the foam. Holddown characterizes the service life of the defoamer, i.e., the duration of its activity. Specifically a measurement is made of the time taken for the foam to regain a defined level. Alongside these the knockdown time characterizes the time taken to reach knockdown, relative to the foam maximum. Prior art precipitated silicas have unsatisfactory values for some if not all of the stated parameters.

SUMMARY OF THE INVENTION

Accordingly, it is an object of the present invention to provide precipitated silicas having enhanced performance properties, particularly in defoamer formulations. The invention also provides a process by which the precipitated silicas of the invention can be prepared.

Surprisingly it has been found that this object is achieved by the silicas of the invention defined in more detail in the description below and also in the claims and the examples, and by the process described in more detail in the description, examples and claims.

The present invention provides hydrophobic alkaline precipitated silicas characterized by the following physicochemical parameters:

| | |
|---|---|
| BET | $<110\ m^2/g$ |
| CTAB | $<150\ m^2/g$ |
| BET/CTAB ratio | $<3$ |
| Carbon content | $>3.1\%$ |
| pH | $>9$ |

The invention further provides hydrophobic precipitated silicas which in addition to the abovementioned parameters, independently of one another, have one or more of the following physicochemical parameters:

| | |
|---|---|
| DBP | $<230\ g/(100\ g)$ |
| Modified Sears number | $<6\ ml/(5\ g)$ |
| Sears number/BET ratio | $<0.05\ ml/(5\ m^2)$ |
| Methanol wettability | $>50\%$ |
| Mean particle size $d_{50}$ | $<14\ \mu m$ |
| Loss on ignition | $>3\%$ |
| Tapped density | $<150\ g/l$ |

The present invention further provides a process by which the precipitated silicas of the invention can be prepared, comprising the following steps:

a) precipitating a precipitation silica,
b) filtering,
c) liquefying the filtercake by adding water,
d) drying the suspension,
h) heat treating at more than 150° C., and
i) milling the hydrophobic precipitated silica, which further comprises performing a step of e) alkalifying the precipitated silica by adding at least one basic agent and includes a step of f) preparing a mixture of at least one hydrophobicizer and a precipitated silica, a precipitated silica dispersion or a precipitated silica filtercake and optionally includes a step of g) conditioning at 10° C. to 150° C. for a period of 0.5 to 72 h.

Steps e), f) and g) can be carried out at different points in time and in different sequence in the process of the invention.

In further embodiments, the invention provides for the use of the precipitated silicas of the invention, particularly in defoamer formulations.

The inventors recognized that precipitated silicas particularly suitable for use in defoamer formulations are preferably of a nature such that they may insert themselves optimally at the interface between oil and water. This permits effective destruction of foam bubbles. It was found to be important for the surface of the precipitated silicas to combine a certain blend of hydrophilic and hydrophobic properties. The hydrophilic centers of the silica surface are controlled by adjusting the pH. The higher the pH of the end product, the more pronounced the hydrophilic centers on the silica surface. Hydrophilic centers, however, can come about at those sites on the surface of the precipitated silica where silanol groups were present prior to treatment with the basic component. In some cases hydrophilic carriers can come about only at those sites on the surface of the silica where silanol groups were present prior to treatment with base. In order not to give the silica too sharp a hydrophilic character it is important that the precipitated silicas of the invention have a low silanol group density. This silanol group density can be expressed by the Sears number/BET ratio. The precipitated silicas of the invention preferably have by a high pH and a low silanol group density.

It was also found that hydrophobic precipitated silicas with relatively long polysiloxane chains on the surfaces exhibit particularly good defoamer performance. A measure which can be used to value this property is the ratio of BET to CTAB surface.

The precipitated silicas of the invention additionally feature a preferable particle size. The particle size may play an important role, since the silica particles must on the one hand be sufficiently large to break the foam lamella but on the other hand must also be present in sufficient number.

The hydrophobic precipitated silicas of the invention have not only high pH and low silanol group density, but also a high carbon content (>3.1%)

very homogeneous hydrophobicizing, in other words a steep methanol wettability curve high methanol wettability (>50%).

They are therefore outstandingly suitable as a defoamer component in defoamer formulations. In particular they provide a short knockdown time, virtually complete knockdown and long hold down. It is possible to incorporate the precipitated silicas of the invention into defoamer formulations with particular ease and homogeneity.

DETAILED DESCRIPTION OF THE PREFERRED EMBODIMENTS

Figure 1:
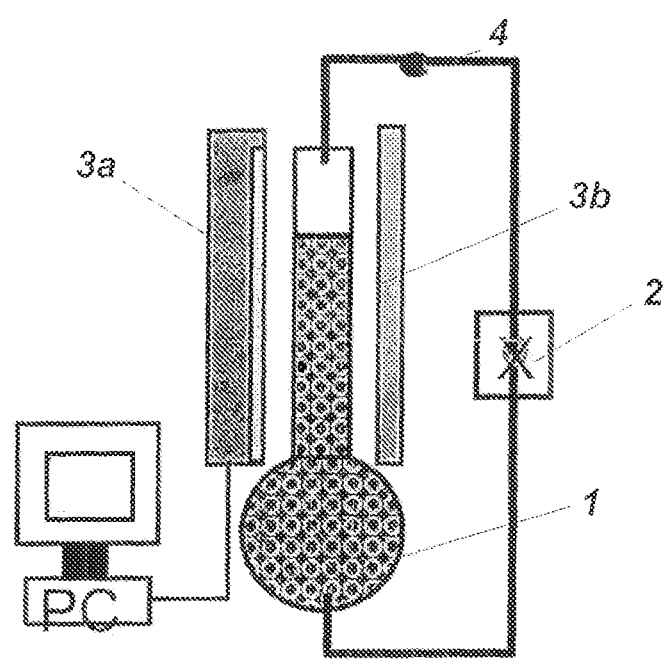
FIG. 1 shows a test apparatus used to measure foaming.

The precipitated silicas of the invention have the following physicochemical parameters:

| | |
|---|---|
| BET | <110 m$^2$/g |
| CTAB | <150 m$^2$/g |
| BET/CTAB ratio | <3 |
| Carbon content | >3.1% |
| pH | >9. |

Additionally they may optionally, independently of one another, have one or more of the following physicochemical parameters:

| | |
|---|---|
| DBP | <230 g/(100 g) |
| Modified Sears number | <6 ml/(5 g) |
| Sears number/BET ratio | <0.05 ml/(5 m$^2$) |
| Methanol wettability | >50% |
| Mean particle size d$_{50}$ | <14 µm |
| Loss on ignition | >3% |
| Tapped density | <150 g/l |

The precipitated silicas of the invention preferably have a BET of 30-110 m$^2$/g, more preferably 40-80 m$^2$/g, even more preferably 50-70 m$^2$/g, a CTAB of 30-120 m$^2$/g, more preferably 50-90 m$^2$/g, even more preferably 60-80 m$^2$/g, and a modified Sears number of 0.3-6.0 ml, more preferably 0.5-2.0 ml, even more preferably 0.8-1.4 ml.

The carbon content, which is an important measure for assessing the hydrophobicity of a precipitated silica, is preferably 4-12%, more preferably 5-10% and with particular preference 6-10%. The methanol wettability is preferably >60%.

A basic agent is added during the preparation of the precipitated silicas to adjust the pH of the dry silica. The higher the pH of the end product, the more pronounced the hydrophilic centers on the silica surface that are beneficial for the defoamer application. Accordingly the pH of the precipitated silica of the invention is preferably between 9-10.5, in particular between 9 and 10, more particularly 9.2-9.8.

Hydrophilic centers may come about on the silica surface at those sites where silanol groups were present prior to treatment with the basic agent. In order not to give the silica too sharp a hydrophilic character it is important that the precipitated silica of the invention has a low silanol group density. This silanol group density can be expressed by the Sears number/BET ratio. In particular the precipitated silicas of the invention can have a Sears number/BET ratio of <0.04 ml/(5 m$^2$), preferably <0.03 ml/(5 m$^2$), in one particular embodiment <0.025 ml/(5 m$^2$).

The BET/CTAB ratio of the precipitated silicas of the invention is preferably <1.5, more preferably <1 and very preferably 0.5-0.99. The mean particle size d$_{50}$, which is a property that is beneficial for effective and homogeneous incorporation into the defoamer formulation, is preferably <10 µm, more preferably <7.5 µm, very preferably <6 µm and in particular <5 µm.

All stated ranges of preference and subranges thereof can be set independently of one another.

The precipitated silicas of the invention may be prepared by a process comprising the steps of
a) precipitating a precipitation silica,
b) filtering,
c) liquefying the filtercake by adding water,
d) drying the suspension,
h) heat treating at more than 150° C., and
i) milling the hydrophobic precipitated silica,
which comprises performing a step of
e) alkalifying the precipitated silica by adding at least one basic agent,
and also coating the precipitated silica with a hydrophobicizer by
f) preparing a mixture of at least one hydrophobicizer and a precipitated silica, a precipitated silica dispersion or a precipitated silica filtercake.

The process of the invention may optionally include a step
g) conditioning at 10° C. to 150° C. for a time of 0.5 to 72 h.

Steps e), f) and g) may be carried out at different points in time in different sequence in the process of the invention.

The conditioned precipitated silica obtained after step g) can either be passed to step h) or mixed with a hydrophilic precipitated silica or precipitated silica dispersion or precipitated silica filtercake, dried if desired as per step d) and conditioned again if desired as per step g). This procedure is repeated until finally the hydrophobicized precipitated silica is passed to step h) and concluding milled in step i).

Step a) of the process of the invention preferably involves carrying out the steps of
aa) heating an initial charge of water, or of water mixed with waterglass, to a temperature of between 60 and 100° C., preferably between 70° C. and 90° C.,
ab) simultaneously adding waterglass and acid to the initial charge, and
ac) lowering the pH by adding an acidifier.

The simultaneous addition of waterglass (a solution of a silicate e.g., sodium or potassium silicate) and acidifier in step ab) is made preferably such that the pH is held at a level of between 7 and 11, preferably 8 to 9. The pH is measured at 60° C. The temperature of the reaction solution is held in step ab) at a level of between 60 and 100° C., preferably between 65 and 95° C., more preferably between 70 and 90° C. The addition of acidifier and waterglass is continued to a solids content of 40 to 70 g/l, preferably 45 to 65 g/l, more preferably 50 to 60 g/l and then stopped. This gives a precipitation time of 70 to 140 minutes, preferably 80 to 130 minutes.

In step ac) the pH of the precipitation suspension is adjusted by adding an acidifier to a level of 2 to 8, preferably 2.5 to 4.0, more preferably 3 to 4. The pH is measured at 60° C. By means of the procedure described here, in the course of the precipitation, a low silanol group density is established on the surface of the precipitated silica.

The waterglass used in step ab) has a modulus of 3 to 3.8, preferably 3.3 to 3.5, and a density of 1.1 to 1.39 g/ml, preferably 1.2 to 1.36 g/ml, more preferably 1.3-1.4 g/ml. The acidifier used in steps ab) and ac) may be a mineral acid, particularly sulfuric acid, hydrochloric acid, phosphoric acid, nitric acid or carbonic acid, or carbon dioxide. Preference is given to sulfuric acid with a concentration of 1 mol/l to 18.76 mol/l and preferably from 7.0 to 18.8 mol/l. Preferably the same acidifiers are used in steps ab) and ac).

Step ac) may be followed if desired by a step ad) aging the precipitation suspension at 10° C. to 95° C., preferably from 40° C. to 60° C., for 0 to 72 hours. Preferably for 0 to 12 hours, even more preferably 2-6 hours.

In step b) the precipitation suspension is filtered and the filtercake is washed. The filtering of the precipitation suspension, prepared beforehand, and the washing of the filtercake are performed by known methods, such as by filtration with a membrane filter press (Ullmann's Encyclopedia of Industrial Chemistry, 1992, 5th edition, vol. B1, page 10-1-10-59, incorporated herein by reference). The filtercake is washed using preferably deionized water. The filtercake obtained has a solids content of 13 to 25%, preferably 15 to 17%.

In step c) the filtercake is liquefied, liquefying includes forming a suspension. In one first embodiment of the process of the invention the filtercake is liquefied by adding water, preferably deionized water, and preferably with stirring.

In another embodiment, step c) is carried out together with step e). In other words the filtercake is liquefied with the addition of water, preferably deionized water, and with stirring. By simultaneous (steps: c)+e)) or subsequent (steps: c)→e)) addition of one or more basic components the pH of the suspension is adjusted to 7-11, advantageously 8-10.5, preferably 8.3-10.

Independently of the embodiment of step c) the suspension obtained has a solids content of 6 to 20%, preferably 6 to 17%, more preferably 6 to 11%. In both embodiments it may be necessary for liquefaction to take place with exposure to moderate shear energy. The amount of shear energy introduced should only be just enough for liquefication.

The suspension obtained from the preceding process stages is dried in step d). A wide variety of drying methods are known to the skilled worker for this purpose (Ullmann's Encyclopedia of Industrial Chemistry, 1992, 5th edition, vol. B1, page 7-21-7-25 incorporated herein by reference). Drying by means of pneumatic conveying drier, spray dryer, rack dryer, belt dryer, rotary tube dryer, flash dryer, spin-flash dryer or nozzle tower has proven advantageous. Drying takes place with particular preference by spray dryer or nozzle tower. Depending on the embodiment in which step f) is to be performed, the moisture content of the precipitated silica can be adjusted in step d).

If the liquefication of the filter cake in step c) takes place without the addition of a basic agent, then the basic component may be sprayed onto the precipitated silica after drying in a mixer (e.g., a low-shear plowshare mixer such as a Lödige mixer, for example). In this case, then, step e) takes place after step d). The pH of the precipitated silica in this case is adjusted to a figure >7, preferably between 7 and 11, more preferably between 8 and 10.5 and in particular between 8.3 and 10.

As the basic agent in step e) it is possible to use alkali metal hydroxides or carbonates, alkaline earth metal hydroxides or carbonates, alkali metal oxides, alkaline earth metal oxides, alkali metal silicates, alkaline earth metal silicates, ammonia and alkali metal aluminates or aqueous solutions or mixtures of said bases. Preference is given to using sodium and potassium hydroxide solutions.

It is also possible to add a basic agent both during step c) and after step d). In that case the basic components referred to above can be used.

Step f) of the process of the invention can be performed as wet or dry hydrophobicization. Wet hydrophobicization means that the silicatic starting materials are aqueous silica suspensions or high-water-content silica filtercakes, which are populated with the corresponding hydrophobicizers, as described for example in DE 27 29 244 for precipitation suspensions with organohalosilanes. Dry hydrophobicization means that the silicatic starting materials are silica powders having different moisture contents of 1 to 75%, which are coated with the corresponding hydrophobicizers. A process of this kind is described for example in DE 26 28 975. The teachings of DE 26 28 975 and DE 27 29 244 are expressly incorporated in this specification by reference, being considered part of the description of the present specification.

Step f) of the process of the invention can be carried out in the following versions or embodiments:

Version 1:

The hydrophobicizer is added to a precipitated silica having a water content of 1.0 to 80% by weight, preferably 2 to 50% by weight. The water content can be adjusted in the course of drying in step d) or, if the basic agent (step e) is not added until after step d), by further drying or moistening if desired. In this case the following process sequences are possible: c)+e)→d)→f) or c)→e)→d)→f) or c)→d)→e)→f).

Version 2:

Step f) is carried out between steps a) and b). In other words the hydrophobicizer is added after the silicate has been precipitated with an acid, the addition taking place to the resultant dispersion of the precipitated silica. In the case of this embodiment it is possible to use, for example, a Rhein-Hütte mixer or a Kolthof mixing siren or an Ultra-Turrax. This version requires rapid filtration and accelerated drying (spin-flash dryer, spray dryer, nozzle tower) after the reaction.

Version 3:

In this case the hydrophobicizer is added to a precipitated silica having a water content of 70 to 99% by weight during subsequent separation of the solid from the water. The solids content can be raised by filtration, nozzle tower, spin-flash or any other accelerated drying. The higher the water content the more rapidly the increase in solids content ought to be performed in order to prevent separation. In this case the following process sequences are possible: c)+e)→f) and immediately→d) or c)→e)→f) and immediately→d) or c)+f) and immediately→e) and immediately→d) or c)→f) and immediately→e) and immediately→d) or c)→e)+f) and immediately→d).

It is for example also possible to mix the filtercake with the hydrophobicizer.

Version 4:

Step f) takes place together with step d) or immediately before d). In this case the precipitated silica or hydrous silica can be passed, at the same time for example as the hydrophobicizer, to a spray dryer, nozzle tower dryer or spin-flash dryer. In this case the following process sequences are possible: c)+e)→f and then immediately→d), c)→d)+f)→e) or c)+e)→d)+f) or c)Δe)→d)+f) or e)+f)+d).

In the case of spin-flash drying step c) is optional and therefore may also be omitted entirely.

In the case of spin-flash drying the filtercake can be mixed before drying with the basic agent and the hydrophobicizer and then dried, i.e., e)+f)→d).

Version 5:

In this case dry precipitated silica is mixed with the hydrophobicizer in for example a Gericke or Lödige mixer. The following process sequences are possible: c)+e)→d)→f) or c)→e)→d)→f) or c)→d)→f)→e). The mixing of dried precipitated silica with the hydrophobicizer is also possible in the course of the milling (step i)) in the mill.

The process sequences depicted in versions 1 to 5 reflect extracts from the overall production operation. With the exception of version 2, steps a) and b) are carried out first in all the versions. Step c) then follows. Where two process steps are connected by a "+" sign (e.g., c)+e)), this means that the two process steps are carried out together. Where, on the other hand, the process steps are joined by an "→" (e.g., c)→e)), this means that the process steps are carried out in succession. The final process step indicated in each case is followed by the process steps referred to in the general process description with the letters h) and i) and if desired g). In the case of version 2 step b) is followed by steps c)-i), with g) being optional.

The process of the invention embraces versions wherein step f) is carried out such that the hydrophobicizer is mixed with an already alkalified precipitated silica and versions wherein the hydrophobicizer is added before or at the same time as step e), i.e., the alkalifier is added. Preference is given to those versions where the hydrophobicizer is added to the pulverulent, already alkalified precipitated silica.

Preference is given to carrying out versions 1 and 5. Version 1 is particularly preferred. With very particular preference version 1 is carried out such that steps are carried out in the order c)+e)→d)→f) or c)→e)→d)→f) or c)→d)→e)→f).

As hydrophobicizers organopolysiloxane derivatives may be used; it is, however, also possible to use other silicon compounds which react to give organopolysiloxanes under the chosen reaction conditions (for example, dichlorodimethylsilane in an aqueous environment).

Hydrophobicizing reagents used are organopolysiloxane derivatives or their precursors: for example, those of composition $R_{4-n}SiX_n$ (with n=1, 2, 3), $[SiR_xX_yO]_z$ (with $0 \leq x \leq 2$, $0 \leq y \leq 2$, $3 \leq z \leq 10$ with x+y=2), $[SiR_xX_yN]_z$ (with $0 \leq x \leq 2$, $0 \leq y \leq 2$, $3 \leq z \leq 10$ with x+y=2), $SiR_nX_mOSiR_oX_p$ (with $0 \leq n \leq 3$, $0 \leq m \leq 3$, $0 \leq o \leq 3$, $0 \leq p \leq 3$, with n+m=3, o+p=3), $SiR_nX_mNSiR_oX_p$ (with $0 \leq n \leq 3$, $0 \leq m \leq 3$, $0 \leq o \leq 3$, $0 \leq p \leq 3$, with n+m=3, o+p=3), $SiR_xX_m[SiR_xX_yO]_zSiR_oX_p$ (with $0 \leq n \leq 3$, $0 \leq m \leq 3$, $0 \leq x \leq 2$, $0 \leq y \leq 2$, $0 \leq o \leq 3$, $0 \leq p \leq 3$, $1 \leq z \leq 10000$ with n+m=3, x+y=2, o+p=3). These compounds may be linear, cyclic and branched silane, silazane and siloxane compounds. R may be alkyl and/or aryl radicals, which may be substituted by functional groups such as the hydroxyl group, the amino group, polyethers such as ethylene oxide and propylene oxide, and halide groups such as fluoride. R may also contain groups such as hydroxyl, amino, halide, alkoxy, alkenyl, alkynyl and aryl groups, and groups containing sulfur. X may include reactive groups such as hydroxy, silanol, amino, mercapto, halide, alkoxy, alkenyl and hydride groups. Preference is given to linear polysiloxanes having the composition $SiR_nX_m[SiR_xX_yO]_zSiR_oX_p$ (with $0 \leq n \leq 3$, $0 \leq m \leq 3$, $0 \leq x \leq 2$, $0 \leq y \leq 2$, $0 \leq o \leq 3$, $0 \leq p \leq 3$, $1 \leq z \leq 10000$ with n+m=3, x+y=2, o+p=3) in which R is preferably represented by methyl.

Particular preference is given to using polysiloxanes having the composition $SiR_nX_m[SiR_xX_yO]_zSiR_oX_p$ (with $0 \leq n \leq 3$, $0 \leq m \leq 1$, $0 \leq x \leq 2$, $0 \leq y \leq 2$, $0 \leq o \leq 3$, $0 \leq p \leq 1$, $1 \leq z \leq 1000$ with n+m=3, x+y=2, o+p=3) in which R is preferably represented by methyl. Owing to the chosen process of the invention, however, it is specifically also possible to use polysiloxanes of low volatility which contain no functional groups. Because of the presence of certain functional groups in organopolysiloxane derivatives it is possible for salts or low molecular mass substances such as $NH_3$, amines, alcohols, etc. to be formed, which can lead to disruptive impurities. An important exception here is constituted by silanol-functionalized polysiloxanes, since the only impurity formed in that case is water, which is easy to remove under the chosen operating conditions.

With preference the hydrophobicizer may comprise a methyl-terminated polydimethylsiloxane, in particular one having a viscosity of 5-100 mPa·s, 10-100 mPa·s, 30-100 mPa·s, preferably 40-60 mPa·s. An example of a suitable polysiloxane oil is DOW CORNING (R) 200 FLUID 50 CS.

Optionally it is possible in the process of the invention for a step g) to be carried out. Step g) is carried out with mixtures of the precipitated silica and the hydrophobicizer or with precipitated silicas already coated with the hydrophobicizer. It involves a heat treatment of the precipitated silica mixed or coated with hydrophobicizer, at a temperature of from 10 to 150° C., preferably from 100 to 150° C., more preferably at 105° C. to 110° C. Step g) is carried out until a material has been formed which is wettable by water but for which silica and silicone oil no longer separate from one another on introduction into water. Accordingly the conditioning in step g) generally takes place for a period of 0.5 to 72 hours, preferably 0.5 to 2 hours. One preferred embodiment conditions at 100 to 150° C. for 0.5 to 2 hours.

If step g) is followed immediately by step h) then a methanol wettability >20% is preferred. If, however, step g) is not carried out directly before step h) then the methanol wettability should be <20%.

Normally step g) is carried out after step d), it being possible if desired for steps e) and f) or else only e) or only f) to take place between steps d) and g). The following embodiments are preferred: c)+e)→d)→f)→g) or c)→e)→d)→f)→g) or c)→d)→e)→f)→g) or c)+e)→f)→d)→g) or c)→e)→f)→d)→g) or c)+f)→e)→d)→g) or c)→f)→e)→d)→g) or c)→e)+f)→d)→g).

The conditioning time in step g) is 0.5 to 72 hours, preferably 0.5 to 12 hours, more preferably 0.5 to 2 hours. With particular preference the post-conditioning, partially hydrophobicized silica has a methanol wettability of 20% or more.

Step f) of the process of the invention can be carried out, in a version 6, by mixing an already conditioned precipitated silica after step g) with a hydrophilic precipitated silica. In this case it is possible first to prepare a masterbatch, i.e., a conditioned precipitated silica, obtained according to process steps a) to g), in accordance with one of the abovementioned embodiments and then to mix said masterbatch with a (hydrophilic) or water-containing precipitated silica.

In this case, for example, a base silica according to step d) or e) is coated in a mass ratio of hydrophobicizer to precipitated silica of 3:1 to 1:5, preferably 1:1 to 1:3, with a hydrophobicizer, e.g., silicone oil, e.g., DOW CORNING (R) 200 FLUID 50 CS (dimethylpolysiloxane 50 mPa·s, terminated with trimethylsilyl groups, carbon content about 33%) (step f)). The powder thus formed is subsequently conditioned for half an hour at a temperature of more than 100° C., preferably from 100 to 150° C., more preferably from 105 to 110° C. Conditioning (step g) is continued until a material has formed which is wettable by water (methanol wettability <20%) but for which silica and silicone oil can no longer be separated from one another on introduction into water.

This masterbatch is subsequently mixed with a (hydrophilic) or water-containing precipitated silica (e.g., filtercake after step b) or silica dispersion after one of steps a) or c) or c)+e) or c)→e)). The water content of the hydrophilic precipitated silica may vary within the ranges already stated. Mixing the masterbatch with aqueous silica dispersions produces stable mixtures for which the hydrophobicizer—silicone oil for example—no longer separates from the silica. The overall mixture typically includes 1 part by weight of hydrophobicizer, about 4-8 parts by weight of precipitated silica and 20-60 parts by weight of water.

One example of the preparation of such a suspension runs as follows:

A masterbatch (50% silica and 50% silicone oil) is mixed thoroughly with about 10-16 times the amount of filtercake (solids content about 20%) and about 10-20 times the amount of additional water.

The advantage of this procedure is that the water-wettable masterbatch (which may contain up to 75% of hydrophobic organopolysiloxane) can be dispersed very finely and stably, directly in the silica suspension, without the use of emulsifiers or surfactants being necessary. After drying or filtration and subsequent drying of such a mixture the organopolysiloxane-containing silica thus obtained can be conditioned (step g)). These steps can be carried out individually, where appropriate with milling beforehand. Milling ought not, however, to be carried out prior to coating f). It is also possible to carry out two or more of these versions—that is, identical or different versions—in succession.

The following further embodiments of the process of the invention are possible:
  one of process steps f), g) and h) is performed repeatedly (e.g., 2 to 5 times) in succession.
  process steps 0 and h) are carried out repeatedly (2 to 5 times) in succession.
  all process steps f), g) and h) are carried out repeatedly (2 to 5 times) in succession, in other words the operation is run through a number of times.

Since the hydrophobicizers may be compounds of low volatility, an important part in the predistribution of the hydrophobicizers on the silica surface is played by capillary forces and diffusion events at the liquid/solid phase boundary.

Even if the hydrophobicizers used with preference exhibit a certain volatility in the course of a thermal treatment, the liquid/solid distribution is nevertheless important. For this reason a distinction is made here between physical redistribution, conditioning and heat treatment.

Heat treatment, i.e., process step h), is carried out at not less than 150° C., preferably not less than 170° C., advantageously not less than 190° C.

The milling and classifying of precipitated silicas (step i) takes place in accordance with known methods, e.g., impact classifier mills or jet classifier mills (Ullmann's Encyclopedia of Industrial Chemistry, 1992, 5th edition, vol. B1, page 5-20-5-39, page 17-1-17-17, incorporated herein by reference). The precipitated silica of the invention can be milled to the desired ultimate fineness on a variety of mills such as, for example, an impact mill, air jet mill or opposed-jet mill. Classifying may take place during or after milling. In general the hydrophobic precipitated silicas of the invention are milled to a mean particle size $d_{50}$ of <14 μm, preferably <10 μm, more preferably <7.5 μm, very preferably <6 μm and in particular <5 μm.

The precipitated silicas of the invention are used preferably in defoamer formulations for preventing excessive foaming.

The silicas of the invention can additionally be used in all applications in which silicas are commonly used, such as, for example, as a reinforcing filler in silicone rubber, in HTV silicone rubber as a lightening additive in peroxidically crosslinking systems, as a flow assistant, in battery separators, as an antiblocking agent, as a flatting agent in inks and paints, as a vehicle for—for example—agricultural products and foodstuffs, in coatings, in printing inks, in fire-extinguishing powders, in plastics, in the nonimpact printing sector, in paper stock, in the personal care sector, and in specialty applications.

Use in the nonimpact printing sector, such as in the ink-jet process, is a reference to the use of the silicas of the invention in
  printing inks for thickening or for preventing misting and setoff;
  paper as a filler, coating pigment, blueprint paper, heat-sensitive paper, in thermal sublimation for preventing ink strikethrough, for improving contrast and image background uniformity, and for improving dot definition and color brilliance.
  Use in the personal care sector refers to the use of the silicas of the invention as a filler or thickener, in the pharmacy or bodycare sector, for example.

Measurement Methods

The physicochemical data of the precipitated silicas of the invention are determined using the following methods:

Determination of BET Surface Area

The specific nitrogen surface area (referred to below as BET surface area) of the pulverulent, spherical or granular silica is determined in accordance with ISO 5794-1/Annex D (incorporated herein by reference) using an Areameter (Ströhlein, JUWE).

Determination of Specific Surface Area (CTAB)

The method is based on the adsorption of CTAB (N-hexadecyl-N,N,N-trimethylammonium bromide) on the "external" surface of the silica, in a method based on ASTM 3765 (incorporated herein by reference) or NFT 45-007 (section 5.12.1.3 (incorporated herein by reference)).

CTAB is adsorbed in aqueous solution with stirring and ultrasound treatment. Excess, unadsorbed CTAB is determined by back-titration with SDSS (dioctylsodium sulfosuccinate solution, Aerosol OT solution) using a titroprocessor, the endpoint being given by the maximum turbidity of the solution and determined using a phototrode. The temperature throughout all of the operations conducted is 23-25° C., to prevent crystallization of CTAB. The back-titration is based on the following reaction equation:

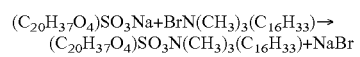

$$(C_{20}H_{37}O_4)SO_3Na + BrN(CH_3)_3(C_{16}H_{33}) \rightarrow (C_{20}H_{37}O_4)SO_3N(CH_3)_3(C_{16}H_{33}) + NaBr$$

SDSS CTAB

Apparatus

Titroprocessor METTLER Toledo type DL 55 and titroprocessor METTLER Toledo type DL 70, each equipped with: pH electrode, Mettler, type DG 111 and phototrode, Mettler, type DP 550

100 ml polypropylene titration beaker

Glass titration vessel, 150 ml, with lid

Pressure filtration device, capacity 100 ml

Cellulose nitrate membrane filter, pore size 0.1 □m, 47 mm □, e.g., Whatman (Order No. 7181-004)

Reagents

The solutions of CTAB (CCTAB=5.5 g/l in deionized water) and SDSS (0.00423 mol/l in deionized water) are purchased in ready-to-use form (Kraft, Duisburg: Order No. 6056.4700 CTAB solution 0.015 mol/l; Order No. 6057.4700 SDSS solution 0.00423 mol/l), stored at 25° C. and used within a month.

Procedure

1. Blank Titration

The consumption of SDSS solution for titrating 5 ml of CTAB solution should be checked 1× daily before each series of measurements. This is done by setting the phototrode, before beginning the titration, at 1000±20 mV (corresponding to a transparency of 100%).

Precisely 5.00 ml of CTAB solution are pipetted into a titration beaker and 50.0 ml of deionized water are added. Titration with SDSS solution is carried out with stirring by the measurement method familiar to the skilled worker, using the titroprocessor DL 55, until the solution reaches maximum turbidity. The consumption $V_A$ of SDSS solution, in ml, is determined. Each titration should be performed in triplicate.

2. Adsorption 10.0 g of the pulverulent, spherical or granulated silica with a moisture content of 5±2% (if appropriate the moisture content is adjusted by drying at 105° C. in a drying oven or uniform wetting) are comminuted for 30 seconds using a mill (Krups, Model KM 75, Article No. 2030-70). Precisely 500.0 mg of the comminuted sample (initial mass E) are transferred to a 150 ml titration vessel with magnetic stirrer rod and precisely 100.0 ml of CTAB solution (T1) are metered in. The titration vessel is closed with a lid and stirred using an Ultra Turrax T 25 stirrer (stirrer shaft KV-18G, 18 mm diameter) at 18 000 rpm for not more than 1 minute until wetting is complete. The titration vessel is screwed onto the titroprocessor DL 70 and the pH of the suspension is adjusted with KOH (0.1 mol/l) to a figure of 9±0.05. If the pH is already greater than 9 no pH correction is performed, so as not to alter the surface.

The suspension is sonicated for 4 minutes in the titration vessel in an ultrasound bath (Bandelin, Sonorex RK 106 S, 35 kHz) at 25° C. It is followed immediately by pressure filtration through a membrane filter under a nitrogen pressure of 1.2 bar. The initial fraction of 5 ml is discarded.

3. Titration 5.00 ml of the remaining filtrate are pipetted into a 100 ml titration beaker and made up to 50.00 ml with deionized water. The titration beaker is screwed onto the titroprocessor DL 55 and titrated with SDSS solution, with stirring, until maximum turbidity is reached. The consumption $V_B$ of SDSS solution, in ml, is determined. Each turbidity should be performed as a triplicate determination.

Calculation $$CTAB\text{(without moisture correction)} = \frac{V_A - V_B}{V_A} * \frac{C_{CTAB} * T_1 * P}{E}$$

$V_A$=Consumption of SDSS solution, in ml, in titrating the blank sample
$V_B$=Consumption of SDSS solution, in ml, when using the filtrate
$C_{CTAB}$=Concentration of CTAB solution in g/l
$T_1$=Amount of CTAB solution added
P=Surface occupancy of 1 g of CTAB=578.435*10−3 m²
E=Initial mass of silica
The CTAB surface is based on the anhydrous silica, which is why the following correction is made.

$$CTAB = \frac{CTAB\text{(without moisture correction) in m}^2\text{/g} * 100}{100 - \text{moisture content in \%}}$$

The moisture content of the silica is determined in accordance with the below-described method of "Determination of Moisture Content or Loss on Drying".

Determination of Carbon Content

The carbon content in silicas is determined using the C-mat 500 (Ströhlein Instruments). The samples are heat treated at about 1350° C. and the carbon is oxidized to $CO_2$ by a stream of oxygen. The $CO_2$ is measured in an infrared cell.

In the measurements a distinction is made as to whether the carbon content is greater than or less than 1 percent. If the carbon content of the homogenous silica samples is above 1 percent, measurement is carried out in the "high" range of the instrument; if it is below 1 percent, measurement takes place in the "low" range.

First of all the control sample is measured. For that purpose 0.14-0.18 g of the control sample are weighed out on an analytical balance onto a porcelain boat purified by calcining and cooled to room temperature. When the start button is operated the weight is carried over, since the balance is coupled with the C mat. The boat must be pushed into the middle of the combustion tube within 30 seconds. When combustion is at an end the measurement is converted into pulses and evaluated by the computer. At least 3 determinations (depending on agreement) are carried out. If appropriate it is necessary to readjust the factor of the instrument (for details see operating instructions C-mat 500, Ströhlein Instruments). This factor is calculated according to the following formula:

$$Factor = \frac{\text{Setpoint (standard)} * \text{Initial mass (standard) in g} * 10^8}{\text{pulses}}$$

Subsequently the silica samples are measured. The initial mass is 0.04-0.05 g. The porcelain boat is covered with a porcelain lid. In the event of deviations >0.005% a greater number of measurements are carried out and the average is calculated.

The C-mat 500 is operated in accordance with the operating instructions from Ströhlein Instruments.

The carbon content in % is calculated as follows:

$$\text{Carbon content} = (I*F*10^{-8})/E$$

I=Pulse
F=Factor
E=Initial mass in g

Determination of pH

The method, based on DIN EN ISO 787-9 (incorporated herein by reference), serves for determining the pH of an aqueous suspension of silicas at 20° C.

Prior to pH measurement the pH meter (Knick, type 766 pH meter Calimatic with temperature sensor) and the pH electrode (Schott N7680 combination electrode) must be calibrated, using the buffer solutions, at 20° C. The calibration function is to be chosen such that the two buffer solutions used include the expected pH of the sample (buffer solutions of pH 4.00 and 7.00, pH 7.00 and pH 9.00 and, where appropriate, pH 7.00 and 12.00).

5.00 g of pulverulent or spherical, hydrophobic silica with a moisture content of 5±1% (where appropriate the moisture content is adjusted by drying at 105° C. in a drying oven or by uniform wetting prior to any comminution) are weighed to an accuracy of 0.01 g on a precision balance into a wide-necked glass bottle which has been tared beforehand. The suspension is made up to the 100 ml mark using 50.0 ml of analytical-grade methanol and 50.0 ml of deionized water.

Subsequently the suspension is shaken in the sealed vessel for 5 minutes using a shaker machine (Gerhardt, model LS10, 55 W, level 7) at 20° C. The pH is measured directly thereafter. For that purpose the electrode is rinsed first with deionized water and then with a portion of the suspension, and then is immersed into the suspension. A magnetic stirrer bar is then added to the suspension, and the pH measurement is carried out at constant stirring speed with a slight vortex being formed in the suspension. After exactly 5 minutes the pH is read off on the display.

Determination of DBP Absorption

The DBP absorption (DBP number), which is a measure of the absorbency of the precipitated silica, is determined by a method based on standard DIN 53601 (incorporated herein by reference), as follows:

12.50 g of pulverulent or spherical silica with a moisture content of 0-10% (the moisture content is adjusted where appropriate by drying at 105° C. in a drying oven) are introduced into the kneader chamber (article number 279061) of the Brabender absorptometer "E" (without damping of the outlet filter of the torque sensor). In the case of granules the sieve fraction from 3.15 to 1 mm (stainless steel sieves from Retsch) is used (by gently pressing the granules with a plastic spatula through the sieve with a pore size of 3.15 mm). With continuous mixing (kneader paddles rotating at a speed of 125 rpm) dibutyl phthalate is added dropwise to the mixture at a rate of 4 ml/min at room temperature by means of the Brabender T 90/50 Dosimat. Its incorporation by mixing takes place with only a small amount of force, and is monitored by means of the digital display. Toward the end of the determination the mixture becomes pasty, which is indicated by a sharp increase in the required force. At a display reading of 600 digits (torque of 0.6 Nm) an electrical contact shuts off both the kneader and the DBP feed. The synchronous motor for the DBP feed is coupled to a digital counter, so that the consumption of DBP in ml can be read off.

The DBP absorption is reported in g/100 g and is calculated using the following formula:

$$DBP = \frac{V*D*100}{E} * \frac{g}{100\ g} + K$$

where DBP=DBP absorption in g/100 g
V=consumption of DBP in ml
D=density of DBP in g/ml (1.047 g/ml at 20° C.)
E=initial mass of silica in g
K=correction value as per moisture correction table, in g/100 g The DBP absorption is defined for the anhydrous, dried silica. When moist precipitated silicas are used it is necessary to take into account the correction value K for calculating the DBP absorption. This value can be determined using the correction table below: for example, silica having a water content of 5.8% would mean an addition of 33 g/(100 g) for the DBP absorption. The moisture content of the silica is determined in accordance with the below-described method of "determination of moisture content or loss on drying".

Moisture correction table for dibutyl phthalate absorption—anhydrous

| % water | .0 | .2 | .4 | .6 | .8 |
|---|---|---|---|---|---|
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |

-continued

| % water | .0 | .2 | .4 | .6 | .8 |
|---|---|---|---|---|---|
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of Modified Sears Number of Silicas

By titrating silica with potassium hydroxide solution in the range from pH 6 to pH 9 it is possible to determine the modified Sear number (called Sears number $V_2$ below) as a measure of the number of free hydroxyl groups.

The determination method is based on the following chemical reactions, where "Si"—OH is intended to symbolize a silanol group of the silica:

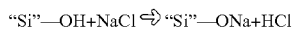

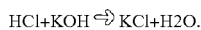

10.00 g of a pulverulent, spherical or granular silica with a moisture content of 5±1% are comminuted for 60 seconds using an IKA universal mill M 20 (550 W; 20 000 rpm). It may be necessary to adjust the moisture content of the starting material by drying at 105° C. in a drying oven or by uniform moistening, and to repeat the comminution. 2.50 g of the silica thus treated are weighed out at room temperature into a 250 ml titration vessel and 60.0 ml of analytical-grade methanol are added. When the sample has been wetted completely, 40.0 ml of deionized water are added and dispersion is carried out using an Ultra Turrax T 25 stirrer (stirrer shaft KV-18G, 18 mm diameter) for 30 seconds at a rotary speed of 18 000 rpm. The particles of the sample adhering to the edge of the vessel and the stirrer are rinsed into the suspension using 100 ml of deionized water, and the suspension is conditioned to 25° C. in a thermostatted waterbath.

The pH meter (Knick, type: 766 pH meter Calimatic with temperature sensor) and the pH electrode (Schott N7680 combination electrode) are calibrated at room temperature using buffer solutions (pH 7.00 and 9.00). The pH meter is used first to measure the initial pH of the suspension at 25° C., and then depending on the result the pH is adjusted to 6.00 using potassium hydroxide solution (0.1 mol/l) or hydrochloric acid solution (0.1 mol/l). The consumption of KOH or HCl solution in ml to reach pH 6.00 corresponds to $V_1'$.

Thereafter 20.0 ml of sodium chloride solution (250.00 g of analytical-grade NaCl made up to 1 l with deionized water) are metered in. Using 0.1 mol/l KOH, the titration is then continued to a pH of 9.00. The consumption of KOH solution in ml to reach pH 9.00 corresponds to $V_2'$.

Subsequently the volumes $V_1'$ and $V_2'$ are first standardized to the theoretical sample weight of 1 g and expanded by a factor of 5, giving $V_1$ and the Sears number $V_2$ in the units ml/(5 g).

Determination of Methanol Wettability

Hydrophobic silicas and silicates can be made water-wettable by adding methanol. This is done by means of methanol/water mixtures of different concentration. In this way it is possible to draw conclusions concerning the degree of hydrophobicization of the silicas or silicates.

Procedure:

200 mg of each hydrophobic silica or silicate are weighed out into 6 centrifuge tubes each with a capacity of 15 ml, and to each of the tubes there are added 8 ml of a methanol/water mixture of ascending methanol concentration.

The methanol concentration of the mixtures is guided by the anticipated methanol wettability. The centrifuge tubes are tightly closed and then shaken vigorously (10 up-and-down movements). To separate the wetted silica/silicate fractions, the tubes are then centrifuged at 2500 rpm for 5 minutes. The wetted fractions form a sediment whose volume can be read off on the scale on the centrifuge tubes. The sediment volumes are plotted against the methanol/water mixture concentration on a graph.

The individual measurement points produce a curve (x axis: percentage fraction of methanol in the methanol/water mixtures, y axis: height of sediment) whose position and slope characterizes the degree of hydrophobicization of the precipitated silica. As a measure of the hydrophobicization the x-axis value (in %) at the point of inflection of the curve is stated.

Determination of Mean Particle Size ($d_{50}$)

The application of laser diffraction for the determination of particle sizes is based on the phenomenon whereby particles scatter monochromatic light with a different intensity pattern in all directions. This scattering is dependent on the particle size. The smaller the particles the greater the scattering angles.

Sample Preparation:

In a 50 ml screw-top glass container, 4 ml of the powder are mixed with 30 ml of ethanol, by shaking.

Procedure:

Prior to the beginning of the measurement the laser diffraction instrument LS 230 (COULTER) and the liquid module (small volume module plus, 120 ml, COULTER) are warmed up for 2 h and the module is rinsed three times with ethanol. An offset measurement and an adjustment are made by the instrument automatically each hour. In the control bar of the instrument software the file window "Calculate opt. model" is selected via the menu item "Measurement" and the refractive indices are defined in an .rfd file: liquid refractive index B.I. real=1.333; material refractive index real=1.46; imaginary=0.1. The pump speed is set at 50%.

In principle a background measurement is carried out automatically before each measurement. A single-use pipette is rinsed three times with the suspension before each sampling. About 2 ml of the suspension are taken up with the pipette and 1-3 drops are metered immediately into the liquid module of the instrument. The remainder in the single-use pipette is introduced back into the glass beaker. Following the addition there is a waiting time until the laser diffraction instrument indicates constant concentration. Suspension is added until a light absorption figure of 8 to 12% is reached and the instrument reports "OK". The measurement is made at room temperature with the evaluation model of the above-determined .rfd file.

First of all a particle measurement without ultrasound is carried out. This is followed by a second, third and fourth measurement of the same sample, with the ultrasound device (SONICS VIBRACELL) switched on at a power of 20 W for 1, 2 and 3 minutes respectively. If the measurements differ substantially from one another then they must be repeated. If the differences remain even after repetition then the measurement reported is that which comes closest to a monomodal Gaussian particle size distribution. Thus, for example, spray-dried, hydrophobicized, unmilled samples typically give reproducible, substantially monomodal particle size distributions when measured without ultrasound treatment. In the case of hydrophobicized, finely milled samples, reproducible, approximately monomodal particle size distributions are often shown only after 2 to 3 minutes of ultrasound. In the case of very finely divided samples it is possible for agglomeration phenomena to occur to a certain extent in the case of prolonged ultrasound treatment.

In case of doubt, either all values are reported or the measurements are labeled accordingly. The codes for 0, 1, 2 and 3 minutes of ultrasound are as follows: 0 min.US, 1 min.US, 2 min.US and 3 min.US.

From the raw data plot the software calculates the particle size distribution on the basis of the volume distribution, taking into account the Mie theory and the optical model parameters (.rfd file).

Determination of Filtercake Solids Content 100.00 g of the filtercake are weighed out (initial mass E) into a dry, tared porcelain dish (diameter 20 cm). The filtercake is broken up with a spatula if necessary to give relatively loose lumps with a maximum volume of 1 cm³. The sample is dried to constant weight in a drying oven at 105±2° C. Subsequently the sample is cooled to room temperature in a desiccator cabinet with silica gel as desiccant. The final mass A is determined gravimetrically.

The solids content in % is determined in accordance with $$SC = A/E*100,$$

where:
SC=solids content in %
A=final mass in g
E=initial mass in g

Determination of Suspension Solids Content

The solids content of the precipitated suspension is determined gravimetrically by filtering the sample.

Procedure 100.0 ml of the homogenized precipitation suspension ($V_{suspension}$) are measured off at room temperature using a measuring cylinder. The sample is filtered through a circular filter (TYPE 572 from SCHLEICHER & SCHUELL) in a porcelain suction filter unit, but is not sucked dry, so as to prevent cracking of the filter cake. Subsequently the filtercake is washed with 100.0 ml of deionized water. The washed filtercake is filtered completely, transferred to a tared porcelain dish and dried to a constant weight in a drying oven at 105±2° C. The weight of the dried silica (msample) is determined.

The solids content in g/l is determined in accordance with:

$$\text{solids content } i = m_{sample}/V_{suspension},$$

where
$m_{sample}$=weight of dried silica
$V_{suspension}$=volume of precipitation suspension investigated Determination of Moisture Content or Loss on Drying The moisture content or loss on drying (LD) of silicas is determined by a method based on ISO 787-2 (incorporated herein by reference) after 2-hour drying at 105° C. This loss on drying is accounted for predominantly by aqueous moisture.

10 g of the pulverulent, spherical or granular silica is weighed out to an accuracy of 0.1 mg (initial mass E) into a dry glass weighing boat with ground-glass lid (diameter 8 cm, height 3 cm). With the lid open, the sample is dried in a drying oven at 105±2° C. for 2 h. Thereafter the weighing boat is closed and cooled to room temperature in a desiccator cabinet with silica gel as drying agent.

The weighing boat is weighed to an accuracy of 0.1 mg on a precision balance, in order to determine the final weight A. The moisture content (LD) in % is determined in accordance with $$LD = (1 - A/E)*100,$$

where A=final mass in g and E=initial mass in g.

Determination of Loss on Ignition

According to this method the loss on ignition of silica at 1000° C. is determined in a method based on DIN EN ISO 3262-1 (incorporated herein by reference). At this temperature physically and chemically bound water and other volatile constituents escape. The moisture content (LD) of the sample investigated is determined by the afore-described method "determination of moisture content or loss on drying" in a method based on DIN EN ISO 787-2 (incorporated herein by reference).

0.5 g of the pulverulent, spherical or granular silica are weighed out to an accuracy of 0.1 mg into a tared porcelain crucible purified by calcining beforehand (initial mass E). The sample is heated in a muffle furnace at 1000±50° C. for 2 h. The porcelain crucible is subsequently cooled to room temperature in a desiccator with silica gel as drying agent. The final mass A is determined gravimetrically.

The loss on ignition (DIN) LOI in % is obtained in accordance with $$LOI = (1 - A/F) * 100.$$

F denotes the corrected initial mass in g, based on dry matter, and is calculated according to $$F = E * (1 - LD/100).$$

In the calculations A denotes final mass in g, E denotes initial mass in g and LD denotes loss on drying, in %.

Determination of Tapped Density

The tapped density is determined in a method based on DIN EN ISO 787-11 (incorporated herein by reference).

A defined amount of a sample which has not been sieved beforehand is introduced into a graduated glass cylinder and subjected to a fixed number of jolts by means of a jolting volumeter. In the course of jolting the sample undergoes compaction. The result of the analysis conducted is the tapped density.

The measurements are carried out on a jolting volumeter with counter from Engelsmann, Ludwigshafen, type STAV 2003.

First of all a 250 ml glass cylinder is tared on a precision balance. Then 250 ml of silica are introduced with the aid of a powder funnel into the tared graduated cylinder in such a way that no cavities are formed. This is achieved by inclining and rotating the cylinder about its longitudinal axis in the course of introduction. Subsequently the sample quantity is weighed to an accuracy of 0.01 g. Thereafter the cylinder is tapped lightly so that the surface of the silica in the cylinder is horizontal. The graduated cylinder is inserted into the corresponding holder on the jolting volumeter and jolted 1250 times. The volume of the jolted sample is read off to an accuracy of 1 ml after one jolting process.

The tapped density D(t) is calculated as follows:

$$D(t) = m * 1000 / V$$

where:
D(t): tapped density in g/l
V: volume of silica after jolting, in ml
m: mass of silica in g The examples below are intended to illustrate the invention without restricting its scope.

EXAMPLE 1

63 l of deionized water were charged to an 80 l precipitating vessel and heated to 88° C. Added to this initial charge were waterglass (modulus=3.5; density=1.343 g/ml) at a metering rate of 6.5 l/h and sulfuric acid (concentration=7.167 mol/l) with a metering rate of 1.56 l/h, metering taking place so as to maintain a pH of 8.0-8.5 (measured on a sample with a temperature of 60° C.). After 105 minutes the metered feeds are ended. Subsequently the precipitation suspension was acidified to a pH of 3.5 with sulfuric acid (concentration=7.167 mol/l), with the same metering rate as before, and the suspension was then aftertreated in a drying oven at 50° C. for a period of 12 h.

The suspension was filtered and washed sufficiently with deionized water. The resulting solids content of the filtercake is 15-17%.

With deionized water introduced initially, and with gentle stirring, the filtercake is liquefied so as to give a silica suspension with a solids content of 6-11%. This suspension was then adjusted to a pH of 9 using NaOH solution (50% by weight). Immediately thereafter the suspension was spray dried (drier exit temperature: 130° C.). After the spray drying operation the precipitated silica was sprayed uniformly in a mixer (M5R, LÖDIGE) with silicone oil (dimethylpolysiloxane, methyl-terminated, 50 mPa·s, e.g., DOW CORNING (R) 200 FLUID 50 CS, carbon content about 33%) with stirring and was heat treated in a muffle furnace at 200° C. for 3 h. The dried precipitated silica was milled using an impact classifier mill (50 ZPS, HOSOKAWA-ALPINE).

The resulting product has the following physicochemical parameters:

| | |
|---|---|
| BET | 56 m$^2$/g |
| Carbon content | 7.9% |
| pH | 9.7 |
| Mod. Sears number | 1.2 ml/(5 g) |
| Sears/BET ratio | 0.021 ml/(5 m$^2$) |
| DBP | 175 g/100 g |
| CTAB | 66 m$^2$/g |
| BET/CTAB ratio | 0.85 |
| Methanol wettability | 65% |
| Mean particle size d$_{50}$ (3 min US/20 W) | 6.4 μm |
| Loss on ignition | 17.7% |
| Tapped density | 127 g/l |

EXAMPLES 2 AND COMPARATIVE EXAMPLES 1-2

In Examples 2 and comparative examples 1-2 precipitated silicas were investigated for their suitability in defoamer formulations. The properties of precipitated silicas were investigated using model formulations which cover a wide range of the fields of application and formulations that are used industrially.

A basic prerequisite for an effective formulation is an efficient dispersion step of the highly dispersed precipitated silica in selected oils. The task here is to distribute the precipitated silica as homogeneously as possible in the oil phase without destroying it through excessive shearing forces.

Preparation of a Dispersion of Precipitated Silica in Silicone Oil

Reagents
Silicone oil "DC 200/100 cs" (polydimethylsiloxane, Dow Corning, data sheet of Mar. 31, 1998)
Hydrophobic precipitated silica
Apparatus
Analytical balance
Glass beaker 250 ml, height: 120 mm; diameter: 60 mm
Ultra Turrax T50 (Janke & Kunkel)

Procedure

Preparing the Silicone Oil Dispersions:

7.00 g of silicone oil and 3.00 g of the test precipitated silica were weighed out on an analytical balance into a 250 ml glass beaker. The precipitated silica was carefully stirred in using a spatula until it is completely wetted. The system was subsequently dispersed with an Ultra Turrax T50 at 10 000 rpm for 10 minutes. The dispersion may undergo warming during this operation.

After the dispersion has been cooled to room temperature it can be used for the performance tests.

Preparation of a Dispersion of Precipitated Silica in Mineral Oil

Reagents

Mineral oil "SHELL RISELLA Oil G 18" (Deutsche Shell, data sheet VSV-T (F) Aug. 7, 1996)

Hydrophobic precipitated silica

Apparatus

Analytical balance

Glass beaker 250 ml, height: 120 mm; diameter: 60 mm

Ultra Turrax T50 (Janke & Kunkel)

Procedure 57.00 g of mineral oil and 3.00 g of the test precipitated silica were weighed out on an analytical balance into a 250 ml glass beaker. The precipitated silica was carefully stirred in using a spatula until it was completely wetted. The system was subsequently dispersed with an Ultra Turrax T50 at 10 000 rpm for 10 minutes. The dispersion may undergo warming during this operation. After the dispersion has been cooled to room temperature it can be used for the performance tests.

Test of Defoaming Action

This defoamer test is particularly suitable for depicting foaming systems in motion.

Reagents:

Test detergent, consisting of:

Sodium dodecylbenzenesulfonate (Maranil® Paste A 55, Cognis Dtl. GmbH & Co. KG, datasheet revision No. 9-01.2000) 11.67%

Fatty alcohol C16-C18 with about 5 mol of EO (Dehydol® TA 5, Cognis Dtl. GmbH & Co. KG, datasheet revision No. 3-01.1998) 1.21%

Fatty alcohol C12-C18 with about 7 mol of EO (Dehydol® LT 7, Cognis Dtl. GmbH & Co. KG, datasheet revision No. 6-08.1999) 7.24%

1-Hydroxyethylidene-1,1-diphosphonic acid (Dequest 2010, Brenntag N.V.,) 0.28%

Sodium salt of a maleic acid/acrylic acid copolymer (Sokolan CP5, BASF AG, datasheet TI/ES 1081d from May 1990) 6.52%

Zeolite A compound (Wessalith 4020, Henkel KGaA) 36.58%

Sodium disilicate (Portil N, Cognis Dtl. GmbH & Co. KG) 3.26%

Sodium carbonate 18.11%

Sodium sulfate 15.13%

To prepare the test detergent all of the raw materials in powder form were charged to a standard commercial mixer, e.g., a Lodige mixer. The liquid raw materials were sprayed onto the powder materials with stirring. After all of the liquid raw materials were sprayed on it was necessary to continue mixing for about 10 minutes in order to achieve a homogeneous distribution.

Silicone oil dispersion or mineral oil dispersion of precipitated silica

Apparatus:

CONTIFOAM apparatus

Gear pump with nozzle

Thermostat

Hotplate

Magnetic stirrer

Microliter pipette

The pump test apparatus is depicted diagrammatically in FIG. 1. It consists of a jacketed glass vessel (1), a temperature-conditioned oil bath, a gear pump (2) and a foam height detection system employing photoelectric cells (3a and 3b). First of all a wash liquor was prepared by stirring 6 g of the test detergent into 994 g of water. This liquor is adjusted to a pH of 13 by adding sodium hydroxide solution.

Figure 2:
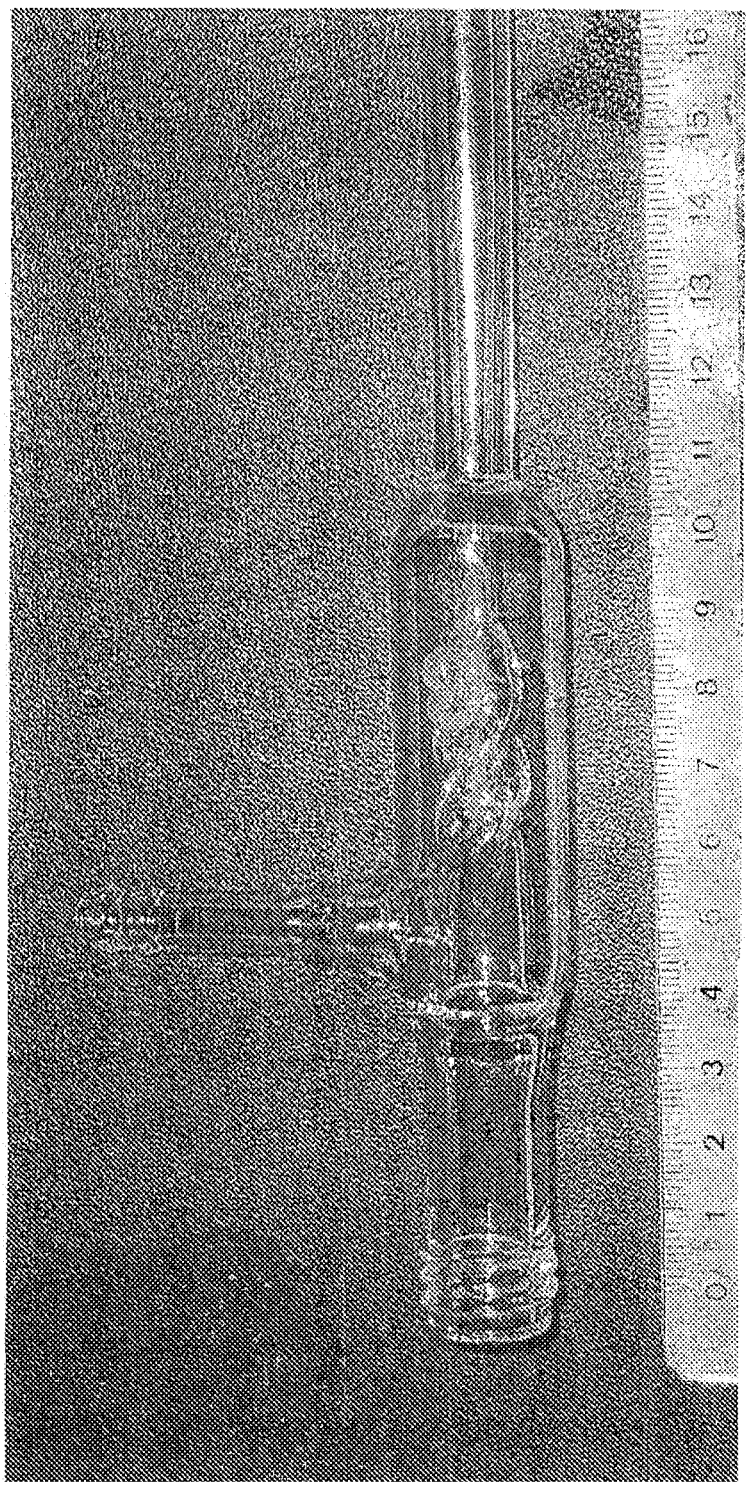
FIG. 2 shows a glass nozzle used to introduce liquid into a testing apparatus.

To carry out the test, 500 ml of this wash liquor were introduced carefully into the glass vessel (1). The wash liquor in the glass vessel was heated to 60° C. and, by engaging a gear pump (2) with a delivery rate of 1200 ml/min, were conveyed through a nozzle (FIG. 2), the wash liquor being foamed. The nozzle used was a Friedrichs-Antlinger waterjet pump (order No. 181-9401; catalogue "VWR" of 2003). At the same time as the gear pump was engaged, measurement was commenced. On reaching the maximum foam height the test defoamer dispersion ((0.07 ml in the case of mineral oil dispersions and 0.01 ml in the case of silicone oil dispersions) was added all at once to the foam solution, using a microliter pipette, and the development of the foam height was recorded as a function of time.

Figure 3:
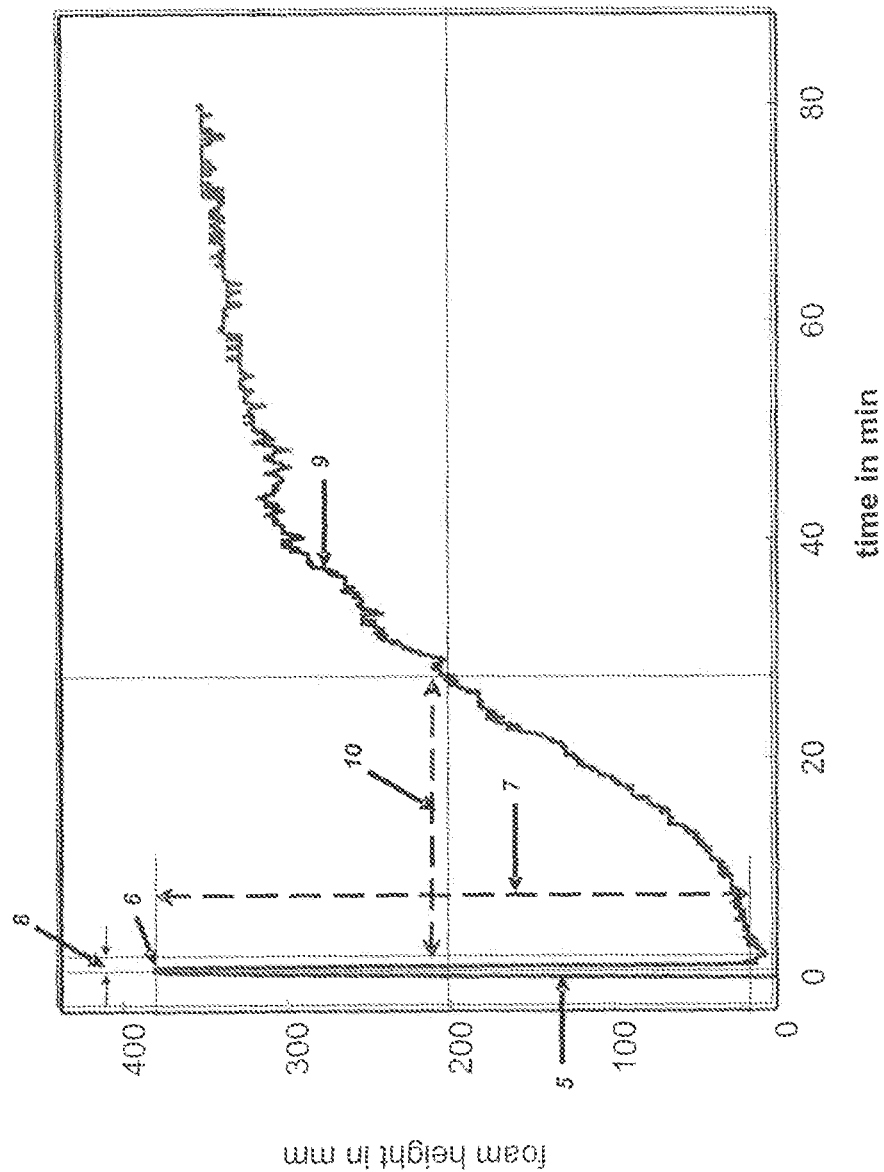
FIG. 3 shows how foam height changes with time.

The schematic course of the plot is depicted in FIG. 3. After the gear pump has been engaged the foam rises to (5). When a defined foam height is reached the defoamer formulation is injected (6). The foam collapses in on itself The remaining foam height emerges as a function of the quality of the defoamer formulation. The ability of the defoamer to reduce the foam height immediately following addition, down to a defined foam height, is described by the knockdown parameter (7). This is defined as the difference between the foam height at the moment when the defoamer formulation is added and the minimal remaining foam height. The time which elapses between addition of the defoamer formulation and attainment of the lowest foam height is referred to as the knockdown time (8). In the further course of the test for defoaming action the action of the defoamer formulation subsides again with a differing rate according to its quality. The foam height rises again to (9). The time which elapses between the moment when the minimum foam height is reached, following the addition of the defoamer formulation, and the time at which a foam height of 200 mm is regained is characterized by the hold down (10) parameter. The hold down is therefore a measure of the service life of the defoamer, i.e., the duration of its activity. Defoamer formulations where the foam height is not reduced to below 200 mm are not assigned a hold down.

The extent of foam formation/amount of foam was regulated by factors including the flow rate, nozzle shape, etc. An advantage of this test method is that a variety of aqueous, thermally conditioned foam solutions can be tested as test solutions under dynamic conditions closely resembling those prevailing in practice. Additionally the defoamer is monitored over a defined period of time. It is possible to state whether the defoamer and hence the silica present therein exhibits an action but also to state how quickly the action begins, how great it is, and how long it lasts. The subsidence of the action of defoamers is a known phenomenon which is accelerated further by extreme conditions (high temperature, high alkalinity, high shearing forces). Since all of these conditions can be mimicked it is possible to say what silica in combination with an oil under real-life conditions exhibits the best defoaming properties.

EXAMPLE 2

Both a mineral oil dispersion and a silicone oil dispersion were produced from the product from example 1 and were investigated for defoaming action.

COMPARATIVE EXAMPLE 1

Both a mineral oil dispersion and a silicone oil dispersion were produced from the hydrophobic precipitated silica Sipernat D10 (DEGUSSA AG), as comparative example 1.

COMPARATIVE EXAMPLE 2

Comparative example 2 involves a hydrophobic precipitated silica from patent EP 1 281 735 (incorporated herein by reference), example 2. Both a mineral oil dispersion and a silicone oil dispersion were prepared from this precipitated silica and were investigated for defoaming action.

TABLE 1

| | | Example 2 | Comparative example 1 | Comparative example 2 |
|---|---|---|---|---|
| BET | $m^2/g$ | 56 | 110 | 96 |
| CTAB | $m^2/g$ | 66 | 78 | 41 |
| BET/CTAB ratio | — | 0.85 | 1.41 | 2.34 |
| Carbon content | % | 7.9 | 2.9 | 3.9 |
| pH | — | 9.7 | 9.9 | 7.9 |
| DBP | g/100 g | 175 | 210 | 207 |
| Mod. Sears number | ml/(5 g) | 1.2 | 5.6 | 1.3 |
| Sears/BET ratio | ml/(5 $m^2$) | 0.021 | 0.051 | 0.014 |
| Methanol wettability | % | 65 | 58 | 67 |
| Mean particle size $d_{50}$ (3 min. US/20 W) | µm | 6.4 | 7.5 | 11 |
| Loss on ignition | % | 17.7 | 5.8 | n.d. |
| Tapped density | g/l | 127 | 114 | n.d. |
| Knockdown[1] | mm | 300.64 | 59.97 | 78.8 |
| Knockdown time[1] | min | 1.58 | 3.09 | 4.75 |
| Holddown[1] | min | 2.45 | — | — |
| Knockdown[2] | mm | 357.37 | 328.6 | 320.96 |
| Knockdown time[2] | min | 0.25 | 0.5 | 0.42 |
| Holddown[2] | min | 0.82 | 0.47 | 0.47 | n.d. = not determined
[1] Mineral oil dispersion/test detergent/pH 13
[2] Silicone oil dispersion/test detergent/pH 13

Figure 4:
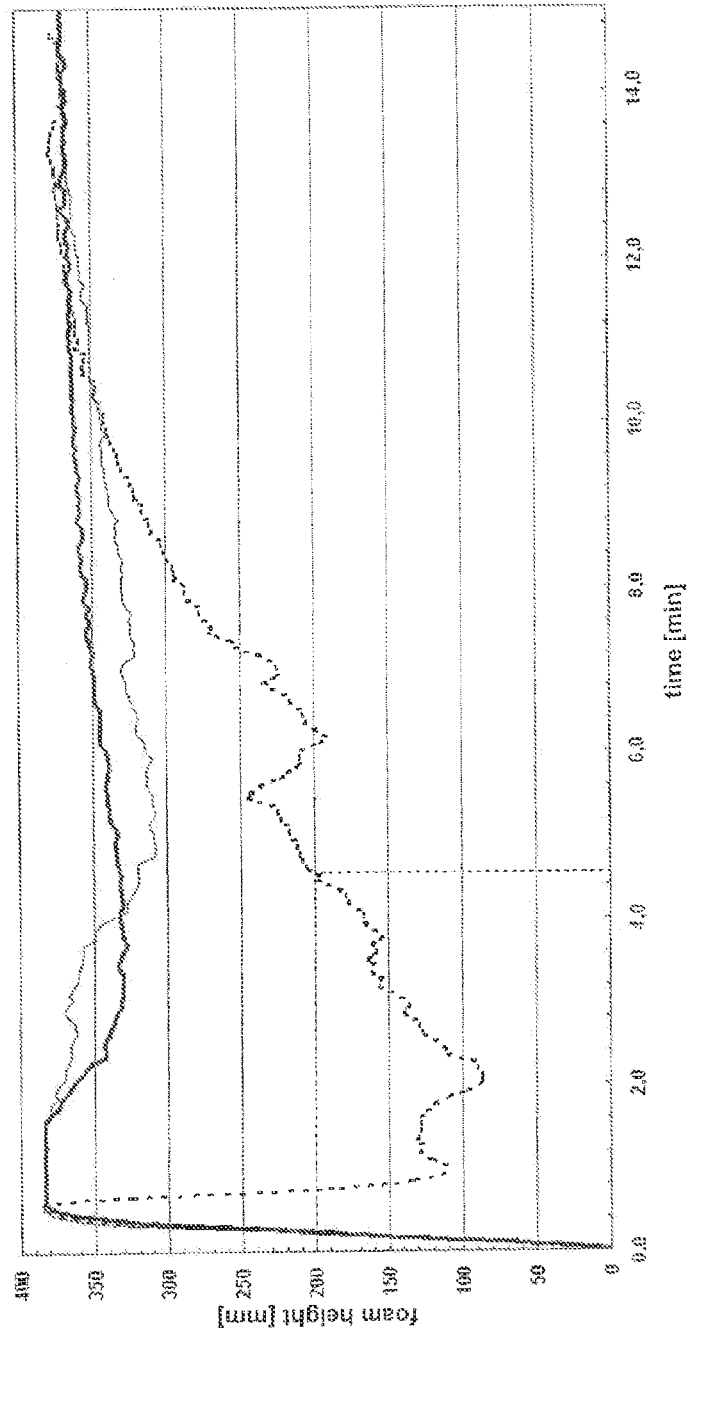
FIG. 4 shows defoaming action for mineral oil dispersions.
Figure 5:
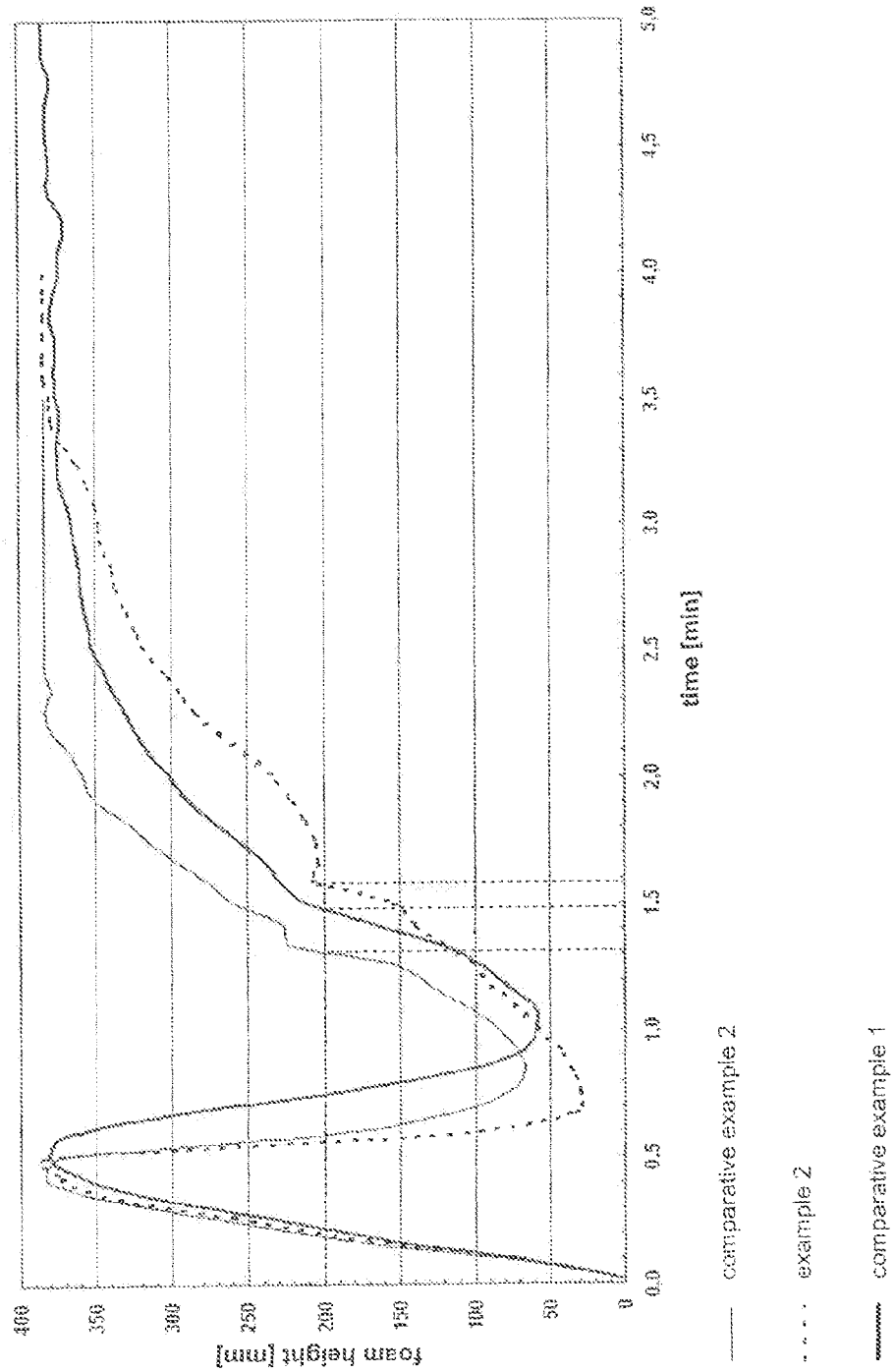
FIG. 5 shows defoaming action for silicone oil dispersions.

The courses of the plots for the test for defoaming action for example 2 and for comparative examples 1-2 are depicted in FIG. 4 (for mineral oil dispersions) and FIG. 5 (for silicone oil dispersions).

German application 102004005411.8 filed on Feb. 3, 2004 is incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

The invention claimed is:

1. A hydrophobic precipitated silica having
   a BET of <110 $m^2/g$,
   a CTAB of <150 $m^2/g$,
   a BET/CTAB ratio of <3,
   a carbon content of 5-12%,
   a pH of 9.7 -10.5,
   a DBP of <230 g/(100 g), and
   a methanol wettability of more than 50%.

2. The hydrophobic precipitated silica as claimed in claim 1, having a modified Sears number of less than 6 ml/(5 g).

3. The hydrophobic precipitated silica as claimed in claim 1, having a silanol group density of less than 0.05 ml/($5m^2$), as measured by the ratio of the modified Sears number to BET.

4. The hydrophobic precipitated silica as claimed in claim 1, having a mean particle size $d_{50}$ of less than 14 µm.

5. A defoamer formulation comprising the hydrophobic precipitated silica according to claim 1.

6. The hydrophobic precipitated silica as claimed in claim 1, having a pH of from 9.8 to 10.5.

7. The hydrophobic precipitated silica as claimed in claim 1 obtained by a process that includes precipitating a precipitation silica and isolating a silica filter cake, then forming a suspension of the silica filter cake in water and adjusting the pH to 9 with at least one basic agent to form an alkalified silica, then spray drying the alkalified silica to form a dried silica, then treating the dried silica with a hydrophobicization agent to form the hydrophobic precipitated silica.

8. A defoamer formulation, comprising:
   a hydrophobic precipitated silica having
      a BET of <110 $m^2/g$,
      a CTAB of <150 $m^2/g$,
      a BET/CTAB ratio of <3,
      a carbon content of 5-12%,
      a pH of 9.7-10.5,
      a DBP of <230 g/(100 g), and
      a methanol wettability of more than 50%; and
   at least one of a mineral oil and a silicone oil.

9. The defoamer formulation according to claim 8, comprising a mineral oil.

10. The defoamer formulation as claimed in claim 8, wherein the hydrophobic precipitated silica has a pH of from 9.8 to 10.5.

11. The defoamer formulation as claimed in claim 8, wherein the hydrophobic precipitated silica is obtained by a process that includes precipitating a precipitation silica and isolating a silica filter cake, then forming a suspension of the silica filter cake in water and adjusting the pH to 9 with at least one basic agent to form an alkalified silica, then spray drying the alkalified silica to form a dried silica, then treating the dried silica with a hydrophobicization agent to form the hydrophobic precipitated silica.

* * * * *